(12) United States Patent
Feng et al.

(10) Patent No.: US 11,583,895 B2
(45) Date of Patent: Feb. 21, 2023

(54) CONNECTION DEVICE FOR PIEZOCERAMICS OF AN ULTRASONIC TRANSDUCER

(71) Applicant: JIANGSU SMTP TECHNOLOGY CO., LTD., Jiangsu (CN)

(72) Inventors: Zhen Feng, Jiangsu (CN); Qun Cao, Jiangsu (CN)

(73) Assignee: JIANGSU SMTP TECHNOLOGY CO., LTD., Jiangsu (CN)

(*) Notice: Subject to any disclaimer, the term of this patent is extended or adjusted under 35 U.S.C. 154(b) by 1105 days.

(21) Appl. No.: 16/219,243

(22) Filed: Dec. 13, 2018

(65) Prior Publication Data

US 2019/0111453 A1 Apr. 18, 2019

Related U.S. Application Data

(63) Continuation of application No. PCT/CN2017/087042, filed on Jun. 2, 2017.

(51) Int. Cl.
*F16B 37/00* (2006.01)
*B06B 1/06* (2006.01)
*F16B 43/00* (2006.01)

(52) U.S. Cl.
CPC ............ *B06B 1/0611* (2013.01); *B06B 1/06* (2013.01); *F16B 37/00* (2013.01); *F16B 43/00* (2013.01)

(58) Field of Classification Search
CPC .......... F16B 5/025; F16B 33/00; F16B 37/00; F16B 39/10; F16B 39/24; F16B 43/00; B06B 1/06; B06B 1/0611

(Continued)

(56) References Cited

U.S. PATENT DOCUMENTS 4,333,028 A  6/1982  Panton
4,362,449 A * 12/1982  Hlinsky ............... B60B 3/16
                                                411/537

(Continued)

FOREIGN PATENT DOCUMENTS

CN  202338548 U  7/2012
CN  103071612 A  5/2013

(Continued)

OTHER PUBLICATIONS

International Search Report for PCT Application No. PCT/CN2017/087042; State Intellectual Property Office of P.R. China; Beijing, China; dated Sep. 15, 2017.

(Continued)

*Primary Examiner* — Roberta S Delisle
(74) *Attorney, Agent, or Firm* — Thomas E. Lees, LLC

(57) ABSTRACT

Disclosed is a connection device for piezoceramics of an ultrasonic transducer, comprising a nut (1), an ultrasonic transducer (5) having a screw structure and to be used with the nut (1), and a plurality of piezoceramics (3) and a plurality of metal sheets (4) fitted on an outer circumference of the screw of the ultrasonic transducer (5) and arranged at intervals. The connection device for the piezoceramics of the ultrasonic transducer further comprises a washer (2) located between the nut (1) and the piezoceramics (3), and the washer (2) is provided with a through hole through which the screw passes. The connection device has high connecting precision, strong working stability, and high working reliability.

9 Claims, 3 Drawing Sheets

(58) Field of Classification Search
USPC ........ 310/311, 248, 348; 411/432, 531, 533, 411/537–538
See application file for complete search history.

(56) References Cited

U.S. PATENT DOCUMENTS

| | | | | |
|---|---|---|---|---|
| 4,654,913 | A * | 4/1987 | Grube ................... | B21D 53/24 |
| | | | | 470/18 |
| 4,717,299 | A * | 1/1988 | Underwood ............ | F16B 43/02 |
| | | | | 411/533 |
| 5,263,997 | A * | 11/1993 | Parker .................. | F01D 25/243 |
| | | | | 415/214.1 |
| 6,286,747 | B1 * | 9/2001 | Chan .................... | B06B 1/0261 |
| | | | | 228/110.1 |
| 7,056,053 | B2 * | 6/2006 | Schilling ................ | F16B 43/02 |
| | | | | 411/537 |
| 7,647,828 | B2 * | 1/2010 | Gassert ............... | B29C 66/9516 |
| | | | | 228/8 |
| 9,618,031 | B2 * | 4/2017 | Hyatt ...................... | F16B 43/00 |
| 9,982,704 | B2 * | 5/2018 | Oka ........................ | F16B 39/24 |
| 2004/0101384 | A1 * | 5/2004 | Schilling ................ | F16B 43/02 |
| | | | | 411/537 |
| 2013/0259600 | A1 * | 10/2013 | Kerechanin, II ...... | F16B 5/0216 |
| | | | | 411/537 |
| 2015/0300401 | A1 * | 10/2015 | Hyatt ..................... | F16B 43/02 |
| | | | | 411/371.2 |

FOREIGN PATENT DOCUMENTS

| | | |
|---|---|---|
| CN | 203578168 U | 5/2014 |
| CN | 205673160 U | 11/2016 |
| EP | 1182971 B1 | 10/2009 |
| EP | 2840806 A1 | 2/2015 |
| GB | 2238592 A | 6/1991 |
| JP | 2003199376 A | 7/2003 |
| KR | 20010092834 A | 10/2001 |

OTHER PUBLICATIONS

Written Opinion of the International Searching Authority for PCT Application No. PCT/CN2017/087042; State Intellectual Property Office of the P.R. China; Beijing, China; dated Sep. 15, 2017.
Translation of the International Search Report for PCT Application No. PCT/CN2017/087042; State Intellectual Property Office of the P.R. China; Beijing, China; dated Sep. 15, 2017.
Translation of Written Opinion of the International Searching Authority for PCT Application No. PCT/CN2017/087042; State Intellectual Property Office of the P.R. China; Beijing, China; dated Sep. 15, 2017.
Examination Report No. 1 for Australian Application No. 2017285917; Australian Government, IP Australia; dated Dec. 4, 2019.
Examination Report No. 2 for Australian Application No. 2017285917; Australian Government, IP Australia; dated Jul. 13, 2020.
Extended European Search Report for European Application No. 17812574.6; European Patent Office, 80298 Munich Germany; dated Jan. 17, 2020.
Supplemental European Search Report for European Application No. 17812574.6; European Patent Office, 80298 Munich Germany, dated Aug. 4, 2020.
Office Action for Mexican Application No. MX/u/2018/000751; Mexican Institute of Industrial Property, Arenal No. 550, Pueblo Santa Maria Tepepan, Ciudad de Mexico, C.P. 16020; dated Dec. 16, 2020.
Office Action for Turkish Application No. 2018/18682; Turkish Patent and Trademark Office, Hippodrome Cad. No. 13 36560, Yenimahalle, Ankara; dated Mar. 29, 2021.

* cited by examiner

CONNECTION DEVICE FOR PIEZOCERAMICS OF AN ULTRASONIC TRANSDUCER

CROSS REFERENCE TO RELATED APPLICATIONS

This is a Continuation application of International Application Serial No. PCT/CN2017/087042, filed Jun. 2, 2017, which claims the benefit of Chinese Application No. 201620589134.6, filed Jun. 17, 2016, the disclosures of which are hereby incorporated by reference.

BACKGROUND

The present disclosure relates to the field of medical instruments and devices, in particular to an ultrasonic transducer, and more particularly to a connection device for piezoceramics of an ultrasonic transducer.

An ultrasonic transducer is an energy conversion device whose function is to convert input electrical energy into mechanical energy (i.e., ultrasonic waves) and then pass it out, while consuming a small amount of power itself. Ultrasonic transducers are used in a wide range of applications. Especially in recent years, ultrasonic transducers are widely used in the field of medical devices, bringing good news for the majority of patients.

Piezoceramics are indispensable components in ultrasonic transducers. In use, a plurality of piezoelectric ceramic sheets and metal sheets stacked together are typically pressed tightly by a pair of a screw and a nut. However, due to parallelism error between parallel surfaces of the piezoelectric ceramic sheets and the metal sheets, when a plurality of piezoelectric ceramic sheets and a plurality of metal sheets are superposed, the error accumulates, which greatly affects assembly precision, thereby affecting use effect of an ultrasonic transducer.

BRIEF SUMMARY

In view of the existing problems, embodiments of the present invention provide a connection device for piezoceramics of an ultrasonic transducer, comprising a nut, an ultrasonic transducer having a screw for use with the nut, and a plurality of piezoceramics and a plurality of metal sheets fitted on an outer circumference of the screw of the ultrasonic transducer and arranged at intervals. The connection device for the piezoceramics of the ultrasonic transducer further comprises a washer located between the nut and the piezoceramics, and the washer is provided with a through hole through which the screw of the ultrasonic transducer passes.

In the connection device for the piezoceramics of the piezoelectric transducer according to some embodiments of the present invention, one end of the nut contacting the washer is of a spherical segment structure, an axis of the spherical segment structure is coincident with an axis of the nut, and the other end of the nut is a flat surface. The washer has a cylindrical outer shape, one end of the washer being in contact with the nut has a concave curved surface fitted with the spherical segment structure of the nut, an axis of the concave curved surface coincides with the axis of the washer, and the other end of the washer is a flat surface.

In the connection device for the piezoceramics of the ultrasonic transducer according to some embodiments of the present invention, a height of the spherical segment structure of the nut is higher than a height of the concave curved surface of the washer fitted with it.

In the connection device for the piezoceramics of the ultrasonic transducer according to some embodiments of the present invention, a diameter of a top circumference of the concave curved surface of the washer is smaller than an outer diameter of the washer. Preferably, outer diameters of the plurality of piezoceramics and the plurality of metal sheets are the same as the outer diameter of the washer.

In the connection device for the piezoceramics of the ultrasonic transducer according to some embodiments of the present invention, it is preferable that the nut is provided with clamping faces for tightening the nut on a side surface of the nut near a flat end thereof. More preferably, the number of clamping faces is an even number and the clamping faces are symmetrically arranged in pairs.

In the connection device for the piezoceramics of the piezoelectric transducer according to some embodiments of the present invention, it is preferable that a diameter of the through hole formed in the washer is not smaller than an external diameter of an external thread of the screw of the ultrasonic transducer.

In the connection device for the piezoceramics of the ultrasonic transducer according to some embodiments of the present invention, preferably, the screw of the ultrasonic transducer extends radially outward at a root thereof to form a stepped surface for supporting a metal sheet in contact with the ultrasonic transducer. More preferably, an outer diameter of the stepped surface is same as an outer diameter of the metal sheet.

With the connection device for the piezoceramics of the ultrasonic transducer according to embodiments of the present invention, the nut having a spherical segment structure is fitted with the washer having a concave curved surface, and the contact surfaces thereof are designed and manufactured in a same spherical size. When the nut and the screw of the ultrasonic transducer are connected, a relative position of the nut and the washer can be automatically adjusted with the increasing of multi-layered piezoceramics and metal sheets, so that the plurality of piezoceramics and metal sheets are subjected to homogeneous force, which improves assembly precision and reduces the influence exerted on the assembly process by the parallelism error produced at contact surfaces of the plurality of piezoceramics and the plurality of metal sheets, and also increases working efficiency of the ultrasonic transducer and ensures work stability and reliability of the ultrasonic transducer.

BRIEF DESCRIPTION OF THE SEVERAL VIEWS OF THE DRAWINGS

In order to more clearly illustrate the specific embodiments of the present invention or the technical solutions in the prior art, the drawings used in the specific embodiments or the description of the prior art will be briefly described below.

REFERENCE NUMERALS

1~nut; 2~washer; 3~piezoelectric ceramic;
4~metal sheet; 5~ultrasonic transducer; 6~clamping face.

DETAILED DESCRIPTION

Exemplary embodiments of the present disclosure will be described hereinafter clearly and completely with reference to accompanying drawings. Apparently, the embodiments described herein are only portions of embodiments rather than all embodiments. It is intended that all other embodiments obtained by those skilled in the art according to the disclosed embodiments without inventive labor are within the scope of the present invention.

In the description of the present disclosure, it is to be noted that the terms of "center", "upper", "lower", "left", "right", "vertical", "horizontal", "internal", "external" and the like simply indicate orientational or positional relationship based on the accompanying drawings and are used only for the purpose of facilitating and simplifying the description of the invention, rather than specifying or implying that any device or elements indicated must have a certain orientation, be constituted with a certain orientation, or operate in a certain orientation. Therefore, these terms will not be interpreted as limiting the present invention. Further, the terms of "first", "second" and "third" are only used for description purpose, rather than being interpreted as specifying or implying relative importance.

In the description of the present disclosure, it is to be noted that, unless otherwise specified or defined clearly, the terms of "attach, "connect to", "connect with", "couple" and the like should be interpreted broadly. For example, they may refer to fixed connection, or detachable connection, or integral connection; they may refer to mechanical connection, or electrical connection; they may refer to direct connection, or indirect connection through an intermediate agent, or internal communication between two components. For those skilled in the art, the specific meaning of these terms in the present disclosure may be understood in combination with specific situations or contexts.

Figure 1:
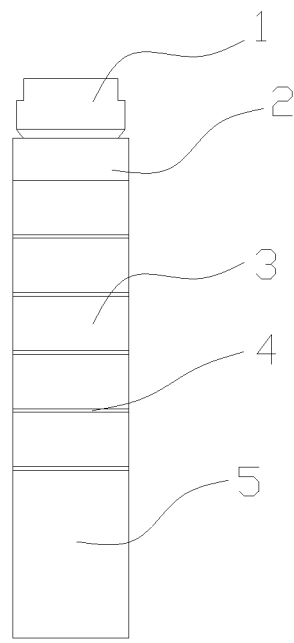
FIG. 1 is a schematic view showing an assembly state of a connection device for piezoceramics of an ultrasonic transducer according to an embodiment of the present invention.

As shown in FIG. 1, a connection device for piezoceramics of an ultrasonic transducer according to an embodiment of the invention comprises a nut 1, an ultrasonic transducer 5 having a screw used for matching with the nut 1, as well as a plurality of piezoceramics 3 and a plurality of metal sheets 4 fitted on an outer circumference of the screw of ultrasonic transducer 5 and arranged at intervals. The connection device for the piezoceramics of the ultrasonic transducer further comprises a washer 2 located between nut 1 and piezoceramics 3, and washer 2 is provided with a through hole through which the screw of ultrasonic transducer 5 passes.

In comparison with the prior art, the connection device for piezoceramics of an ultrasonic transducer according to the embodiment of the invention comprises washer 2, which is mounted between nut 1 and the piezoceramics 3 so as to compensate for the mounting error that is generated and accumulated by superposition of piezoceramics 3 with metal sheets 4.

Figure 3:
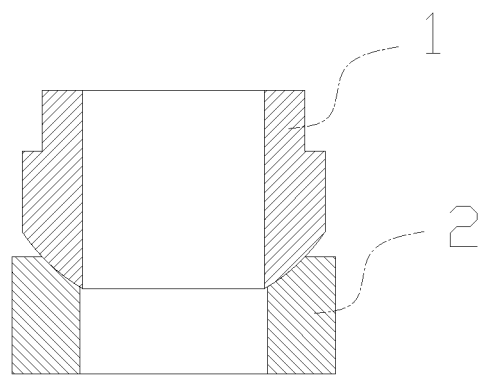
FIG. 3 is a schematic elevational cross-sectional view showing an assembly state of a nut and a washer in a connection device for piezoceramics of an ultrasonic transducer according to an embodiment of the present invention.

As shown in FIG. 3, in the connection device for the piezoceramics of the piezoelectric transducer according to an embodiment of the present invention, one end of nut 1 contacting with washer 2 may be of a spherical segment structure, and an axis of the spherical segment structure is coincident with an axis of nut 1, and the other end of the nut 1 is a flat surface. Washer 2 has a cylindrical outer shape, one end of washer 2 contacting with nut 1 has a concave curved surface being fitted with the spherical segment structure of the nut 1, an axis of the concave curved surface coincides with the axis of washer 2, and the other end of washer 2 is a flat surface.

Figure 2:
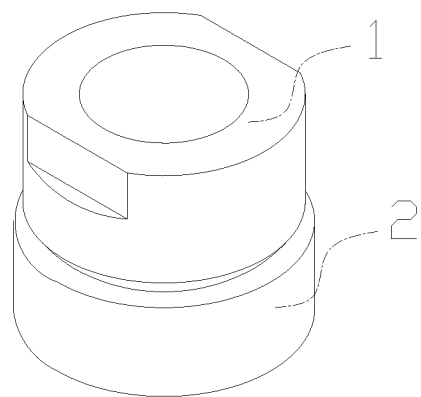
FIG. 2 is a schematic perspective view showing an assembly state of a nut and a washer in a connection device for piezoceramics of an ultrasonic transducer according to an embodiment of the present invention.

As shown in FIGS. 2 and 3, nut 1 having a spherical segment structure is fitted with the washer 2 having a concave curved surface, and the contact surfaces thereof are designed and manufactured in a same spherical size. When nut 1 is connected to the screw of ultrasonic transducer 5, a relative position of the nut 1 and the washer 2 can be automatically adjusted with the increase in multilayer-superposition of piezoceramics 3 and metal sheets 4. Therefore, the plurality of piezoceramics 3 and metal sheets 4 are subjected to homogeneous force, thereby improving assembly precision, reducing the influence on the assembly process by the parallelism error the two contact surfaces generated by the superposition of the plurality of piezoceramics 3 with the plurality of metal sheets 4, improving working efficiency of ultrasonic transducer 5, and ensuring work stability and reliability of ultrasonic transducer 5.

In the connection device for the piezoceramics of the ultrasonic transducer according to an embodiment of the present invention, a height of the spherical segment structure of nut 1 may be higher than a height (i.e., depth) of the concave curved surface of washer 2 which nut 1 matches with. The difference between the height of the spherical segment structure of nut 1 and the height (i.e., depth) of concave curved surface of the washer 2 increases a rotary angle of nut 1 relative to washer 2, further improving assembly precision.

In the connection device for the piezoceramics of the ultrasonic transducer according to an embodiment of the present invention, a diameter of a top circumference of the concave curved surface of washer 2 may be smaller than an outer diameter of washer 2 so as to form an annular surface at the end of washer 2 in contact with the nut 1. The annular surface can protect the concave curved surface of washer 2 from over wearing at an edge thereof. Preferably, the plurality of piezoceramics 3 and the plurality of metal sheets 4 have outer diameters same as the outer diameter of washer 2. Therefore, when viewed as a whole, the connection device for the piezoceramics of the ultrasonic transducer according to the embodiment of the present invention is more tidy and compact in structure.

Figure 4:
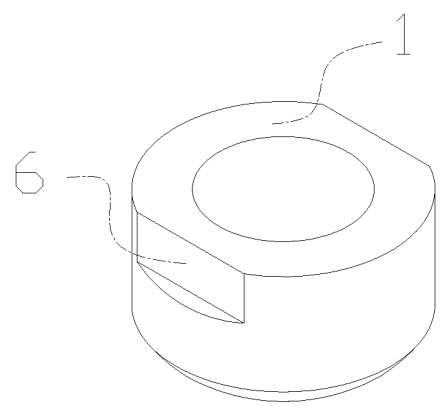
FIG. 4 is a schematic perspective view of a nut in a connection device for piezoceramics of an ultrasonic transducer according to an embodiment of the present invention.

In the connection device for the piezoceramics of the ultrasonic transducer according to an embodiment of the present invention, as shown in FIG. 4, there may be clamping faces 6 machined on a side surface of nut 1 near a flat end thereof to tighten nut 1. Preferably, the number of clamping faces is an even number and the clamping faces are symmetrically arranged in pairs. With the clamping faces 6, it is more convenient for an operator to use a tool to screw the nut 1 tightly, further improving assembly precision and thus further improving work stability and reliability of the connection device for the piezoceramics of the ultrasonic transducer.

Figure 5:
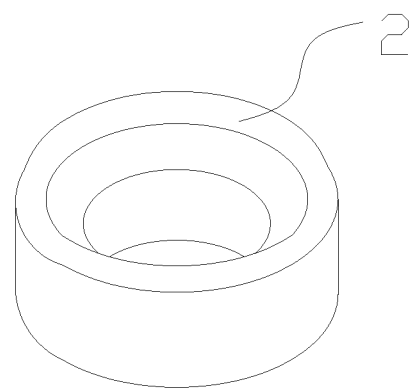
FIG. 5 is a schematic perspective view showing a washer in a connection device for piezoceramics of an ultrasonic transducer according to an embodiment of the present invention.

In the connection device for the piezoceramics of the ultrasonic transducer according to an embodiment of the present invention, as shown in FIG. 5, a diameter of the through hole formed in the washer 2 is not smaller than an external diameter of an external thread of the screw of ultrasonic transducer 5. In this way, the screw of ultrasonic transducer 5 can pass through the through hole of washer 2 freely, so it is convenient for assembly work.

In the connection device for the piezoceramics of the ultrasonic transducer according to some embodiments of the present invention, optionally, the screw of ultrasonic transducer 5 may extend radially outward at a root thereof to form a stepped surface so as to support the metal sheet 4 which is in contact with ultrasonic transducer 5, thus supporting said metal sheet 4 as well as the plurality of piezoceramics 3 and the remaining other metal sheets 4 that are superposed on said metal sheet 4. Preferably, an outer diameter of the stepped surface is identical to an outer diameter of the metal sheet 4.

Compared with the prior art, the connection device for the piezoceramics of the ultrasonic transducer of the invention is ingenious in design, simple in structure, convenient for installation and has low manufacture cost. The problems in the prior art, including low assembly precision, large accumulative assembly error and the like can be solved by the present invention simply by adding one component. When the connection device for the piezoceramics of the ultrasonic transducer of the invention is used for energy conversion, there will be a high stability, high energy conversion efficiency, high reliability and high work efficiency.

Finally, it should be noted that the above embodiments are merely illustrative of the technical solutions of the present invention, and are not intended to be limiting. Although the present invention has been described in detail with reference to the foregoing embodiments, a person skilled in the art should appreciated that the technical solutions described in the foregoing embodiments may be modified, or some or all of the technical features therein may be equivalently substituted. These modifications or substitutions do not make the spirit of the associated technical solutions depart from the scope of the embodiments of the present invention.

What is claimed is:

1. A connection device for piezoceramics of an ultrasonic transducer, comprising a nut, an ultrasonic transducer used with the nut and having a screw structure, as well as a plurality of piezoceramics and a plurality of metal sheets which are fitted on an outer circumference of the screw of the ultrasonic transducer and arranged at intervals, wherein
the connection device for the piezoceramics of the ultrasonic transducer further comprises a washer located between the nut and the piezoceramics, and the washer is provided with a through hole through which the screw of the ultrasonic transducer passes, and
one end of the nut contacting the washer is of a spherical segment structure, the nut is provided with clamping faces for tightening the nut on a side surface of the nut near a flat end thereof, and the nut has a cylinder segment provided between the clamping faces and the spherical segment structure.

2. The connection device for the piezoceramics of the piezoelectric transducer according to claim 1, wherein
an axis of the spherical segment structure is coincident with an axis of the nut, and the other end of the nut is a flat surface; and
the washer has a cylindrical outer shape, one end of the washer in contact with the nut has a concave curved surface fitted with the spherical segment structure of the nut, an axis of the concave curved surface coincides with the axis of the washer, and the other end of the washer is a flat surface.

3. The connection device for the piezoceramics of the ultrasonic transducer according to claim 2, wherein
a height of the spherical segment structure of the nut is higher than a height of the concave curved surface of the washer fitted with it.

4. The connection device for the piezoceramics of the ultrasonic transducer according to claim 1, wherein
a diameter of a top circumference of the concave curved surface of the washer is smaller than an outer diameter of the washer.

5. The connection device for the piezoceramics of the ultrasonic transducer according to claim 1, wherein
the plurality of piezoceramics and the plurality of metal sheets have outer diameters same as an outer diameter of the washer.

6. The connection device for the piezoceramics of the ultrasonic transducer according to claim 1, wherein
the number of the clamping faces is an even number and the clamping faces are symmetrically arranged in pairs.

7. The connection device for the piezoceramics of the ultrasonic transducer according to claim 1, wherein
a diameter of the through hole formed in the washer is not smaller than an external diameter of an external thread of the screw of the ultrasonic transducer.

8. The connection device for the piezoceramics of the ultrasonic transducer according to claim 1, wherein
the screw of the ultrasonic transducer extends radially outward at a root thereof to form a stepped surface for supporting a metal sheet in contact with the ultrasonic transducer.

9. The connection device for the piezoceramics of the ultrasonic transducer according to claim 8, wherein
an outer diameter of the stepped surface is same as an outer diameter of the metal sheet.

* * * * *